United States Patent
Roth et al.

(10) Patent No.: US 8,464,963 B2
(45) Date of Patent: Jun. 18, 2013

(54) VISCOUS COOLANT HEATER WITH VARIABLE COOLANT PUMP DRIVE

(75) Inventors: David B. Roth, Groton, NY (US); Olaf E. Weber, Bloomfield Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 976 days.

(21) Appl. No.: 12/526,961

(22) PCT Filed: Feb. 14, 2008

(86) PCT No.: PCT/US2008/054037
§ 371 (c)(1),
(2), (4) Date: Aug. 13, 2009

(87) PCT Pub. No.: WO2008/101136
PCT Pub. Date: Aug. 21, 2008

(65) Prior Publication Data
US 2010/0044450 A1 Feb. 25, 2010

Related U.S. Application Data

(60) Provisional application No. 60/890,114, filed on Feb. 15, 2007.

(51) Int. Cl.
| | |
|---|---|
| *B60H 1/22* | (2006.01) |
| *B60H 1/03* | (2006.01) |
| *B60H 1/04* | (2006.01) |
| *F24J 3/00* | (2006.01) |

(52) U.S. Cl.
CPC ..................................... *B60H 1/038* (2013.01)
USPC ................. 237/12.3 B; 237/12.3 R; 237/8 A; 237/8 R; 237/19; 237/34; 126/247; 126/344; 122/3; 122/26; 123/41.44; 123/142.5 R; 415/1; 415/55.1

(58) Field of Classification Search
CPC .................................. B60H 1/038; F24J 3/003
USPC ................. 237/8 A, 8 R, 12.3 B, 12.3 R, 19, 237/34; 60/329; 122/1 C, 3, 11, 26; 123/41.44, 142.5 R; 126/247, 344; 137/625.48, 878, 881; 165/156; 192/58.41, 192/54.3, 58.4, 12 A, 216, 48.1, 58.6, 58.63, 192/82 T; 415/1, 55.1
See application file for complete search history.

(56) References Cited

U.S. PATENT DOCUMENTS 1,126,354 A * 1/1915 Becker ............................. 122/26
1,238,447 A * 8/1917 Severy ........................ 192/58.41
(Continued)

FOREIGN PATENT DOCUMENTS
DE 19714668 A1 * 10/1997
JP 2002030932 A * 1/2002

*Primary Examiner* — Steven B McAllister
*Assistant Examiner* — Daniel E Namay

(57) ABSTRACT

A system for supplying supplemental heat to a vehicle, particularly a vehicle with a diesel engine, A driven viscous plate with different viscous clutch faces on either side is provided between the engine and the coolant pump. One side clutches to the engine structure (ground) to generate heat, and the other side clutches to the coolant pump to vary the pump drive. The two sides are controlled by a valve operated by signals from the engine computer. The valve varies the supply of viscous fluid from a common reservoir independently to both sides of the driven viscous plate. The signal from the engine control unit is based on the instantaneous desired supplemental heat and coolant flow. In another embodiment, two separate viscous clutches are utilized and positioned on opposite sides of the coolant pump.

15 Claims, 3 Drawing Sheets

U.S. PATENT DOCUMENTS

| | | | | |
|---|---|---|---|---|
| 1,650,612 A * | 11/1927 | Denniston | ................... | 122/26 |
| 2,573,065 A * | 10/1951 | Salemme | ................ | 192/12 D |
| 2,603,103 A * | 7/1952 | Sohon et al. | ............. | 74/573.1 |
| 2,672,954 A * | 3/1954 | Bennett | ................. | 188/274 |
| 2,695,675 A * | 11/1954 | Frye | ..................... | 180/6.28 |
| 2,750,009 A * | 6/1956 | Pohl | ....................... | 188/296 |
| 3,403,763 A * | 10/1968 | Black et al. | ............ | 192/56.31 |
| 3,860,097 A * | 1/1975 | Braschler et al. | ...... | 188/296 |
| 3,919,844 A * | 11/1975 | Elderton | ................ | 60/330 |
| 4,043,434 A * | 8/1977 | Braschler | ............... | 188/296 |
| 4,201,050 A * | 5/1980 | Nixel | ..................... | 60/357 |
| 4,276,970 A * | 7/1981 | Herrmann et al. | ........ | 188/296 |
| 4,338,524 A * | 7/1982 | Hatz et al. | ............. | 290/2 |
| 4,733,635 A * | 3/1988 | Menard et al. | .......... | 122/26 |
| 5,176,235 A * | 1/1993 | Williams | ................ | 192/58.4 |
| 5,718,375 A * | 2/1998 | Gerard | ................... | 237/12.3 R |
| 5,765,545 A * | 6/1998 | Ban et al. | ............... | 126/247 |
| 5,775,583 A * | 7/1998 | Braatz et al. | ........... | 237/12.3 B |
| 5,794,588 A * | 8/1998 | Vogelsang et al. | ....... | 123/320 |
| 5,897,056 A * | 4/1999 | Morikawa et al. | ...... | 237/12.3 R |
| 6,547,153 B1 * | 4/2003 | Davis | ..................... | 237/19 |
| 7,891,474 B2 * | 2/2011 | McDaniel | ............... | 192/12 A |
| 8,302,876 B2 * | 11/2012 | Sanger et al. | ........... | 237/12.3 R |

* cited by examiner

VISCOUS COOLANT HEATER WITH VARIABLE COOLANT PUMP DRIVE

TECHNICAL FIELD

The present invention relates to supplemental heating systems for vehicles and more particularly to supplemental heating systems particularly for vehicles with diesel engines.

BACKGROUND OF THE INVENTION

There is a demand in vehicles with internal combustion engines for supplemental heat during the warm-up phase that immediately follows a cold-start in cold ambient (winter) conditions. This is particularly true in vehicles with diesel engines since they warm up more slowly than spark-ignition engines. One of the main benefits of rapid warm-up of an engine is improved heater and defroster performance. Also, warm engines run more efficiently and produce lower emissions levels than cold engines.

Additionally, diesel engines have the additional challenge of providing sufficient heat when the vehicle is stuck in a traffic jam in cold ambient conditions. Under some conditions, the engine may not naturally reject sufficient heat to the cooling system to maintain the engine to its set-point. In these cases, supplemental heat may be required long after the cold-start event.

The currently known methods of generating supplemental heat include: (1) electric resistance heating; (2) extra fuel burner and heat exchanger; (3) exhaust system heat exchanger; and (4) viscous heater driven by the engine.

It is known that a direct driven coolant circulation pump in an engine delivers more coolant flow to the engine than is needed at part-throttle or part-load, since the pump is sized for full-throttle or full load at all engine speeds. Since the extra pumping work represents parasitic loss, various systems have been devised to match coolant pump speed to the instantaneous power level rather than just engine speed. Known methods to provide continuously-variable coolant pump speed are: (1) electric motor driven coolant pumps; (2) variable mechanical drives; and (3) variable viscous drives.

Thus, a need exists for improved supplemental heat sources and systems for vehicle engines, particularly for the warmup phases and for diesel engines. Also, a need exists for a variable coolant pump, especially for use in producing supplemental heat for a vehicle.

SUMMARY OF THE INVENTION

The present invention overcomes the above problems and provides an improved supplemental heat system which has particular use for diesel engines in vehicles. The invention includes the functions of a viscous coolant heater (VCH) and a viscous coolant pump drive (VCP) combined in one unit. The invention provides independent control of the heater output and the percent engagement of the coolant pump from the input power source.

A driven viscous plate that has different viscous clutch faces on each side is provided. One of the sides of the viscous clutch clutches to the engine structure (ground) to generate heat. The other side of the viscous clutch clutches to the coolant pump and varies the pump drive. The two sides are fed and controlled by a valve that can independently vary the supply of viscous fluid from a common reservoir to both sides. The operation of the invention is generally governed by signals from the engine control unit (ECU a/k/a engine computer) and is preferably based on the instantaneous desired supplemental heat and coolant flow.

Other objects and features of the present invention will become apparent when viewed in light of the detailed description of a preferred embodiment when taken in conjunction with the attached drawings and appended claims.

DESCRIPTION OF PREFERRED EMBODIMENTS

Supplementary coolant heaters for vehicles with diesel engines are typically in the range of 2 to 4 KW for peak power and are required to attain rapid heater/defroster performance after a cold start in cold (winter) ambient conditions. For some diesel engines, the continuation of supplemental heat is also required in extended idling conditions in cold ambient conditions.

Coolant pumps for diesel engines are required to pump coolant in proportion to the power generated. The power dissipation requirement for a viscous heater (presumably at idle speed) and the total power transmission load (at peak engine speed) for a viscous pump drive in a vehicle are approximately the same.

For the initial warm-up phase of a diesel engine, the viscous heater must be filled and slipping and the viscous pump clutch must be operating somewhere between the low and high slip conditions. The colder the coolant, the slower the pump may be allowed to spin.

Figure 1:
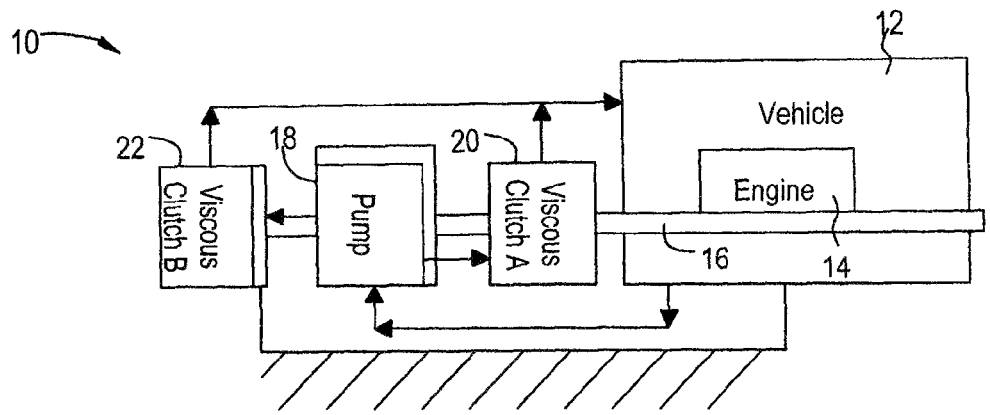
FIG. 1 schematically illustrates one embodiment of the present invention.

One embodiment in accordance with the present invention is shown in FIG. 1. The embodiment is referred to generally by the reference numeral 10 and is utilized with a vehicle 12 having a diesel engine 14. The crankshaft 16 of the engine operates a coolant pump 18. A pair of viscous clutches 20 and 22 are provided on opposite sides of the pump 18.

Shortly after initial startup conditions for the vehicle 12 and to provide some viscous heating, the viscous clutch 20 is filled to provide a maximum coupling with the coolant pump 18. At the same time, viscous clutch 22 is only partially engaged and acts as a brake to slow the speed of the pump. In this manner, both viscous clutches 20 and 22 are slipping and generate heat. The impeller of the pump is only running at a slow speed, but that speed is sufficient to dissipate the heat.

With this embodiment of the invention, it is believed that the required flow for this condition would be close to the full pump speed at idle for a normal coolant pump. This is because most automobile coolant pumps are only marginally large enough for heat/defrost requirements at idle. Also, a viscous driven coolant pump is typically slightly oversized, in order to make up for the maximum viscous clutch slip, which typically is on the order of 2-3 percent.

When supplemental heat is not required, the viscous clutch 22 is emptied and the coolant pump speed is only modulated by the viscous clutch 20.

Figure 2:
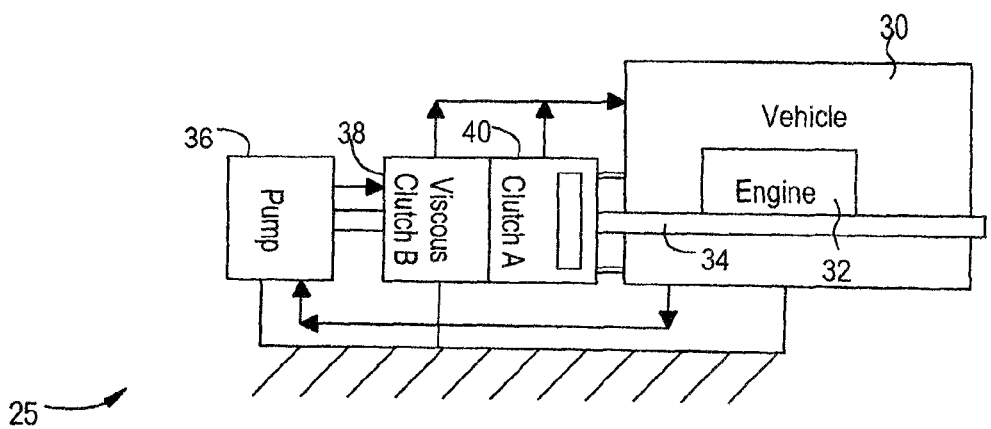
FIG. 2 illustrates another embodiment of the present invention.

Another embodiment of the present invention is shown in FIG. 2 and several steps in its operation are illustrated schematically in FIGS. 3-6. This embodiment is referred to generally by the reference numeral 25. In this embodiment, the coolant flow and the viscous heat are independent.

The vehicle 30 has a diesel engine 32 with a crankshaft 34. The crankshaft operates the coolant pump 36. A two-stage viscous clutch mechanism with viscous clutches 38 and 40 is provided adjacent the pump 36. Viscous clutch 38 is positioned between the impeller of the pump 36 and viscous clutch 40, while viscous clutch 40 is positioned between the viscous clutch 38 and the engine (ground) 32.

The two clutches are preferably combined in one unit or housing, with a common silicone fluid valve and a common fluid reservoir. Any conventional viscous fluid can be utilized, such as silicone. The fluid valve is operable to send the viscous fluid to either one or both of the viscous clutches 38 and 40.

For initial cold startup with the system 25, the pump 36 only has to turn very slowly. Thus, the operating chamber of viscous clutch 38 is empty. At this time, the operating chamber of viscous clutch 40 is full and generates heat while not affecting the pump input speed. As heat is generated, the pump 36 can be brought up to speed to circulate the heated coolant. During this time, heat will be generated primarily by viscous clutch 40 and also by the slip in the coolant pump drive viscous clutch 38.

With system 25, independent control of the coolant pump speed in the viscous heater is present during the warm-up phase of the engine 32. At normal temperatures, when no supplemental heat is required, viscous clutch 40 will have an empty operating chamber and viscous clutch 38 will be modulating the speed of the pump 36.

With this embodiment, two viscous mechanisms are combined in one unit. A single controller apportions the silicone fluid (or working fluid) to the appropriate side for the requisite supplemental heat generation.

Figure 3:
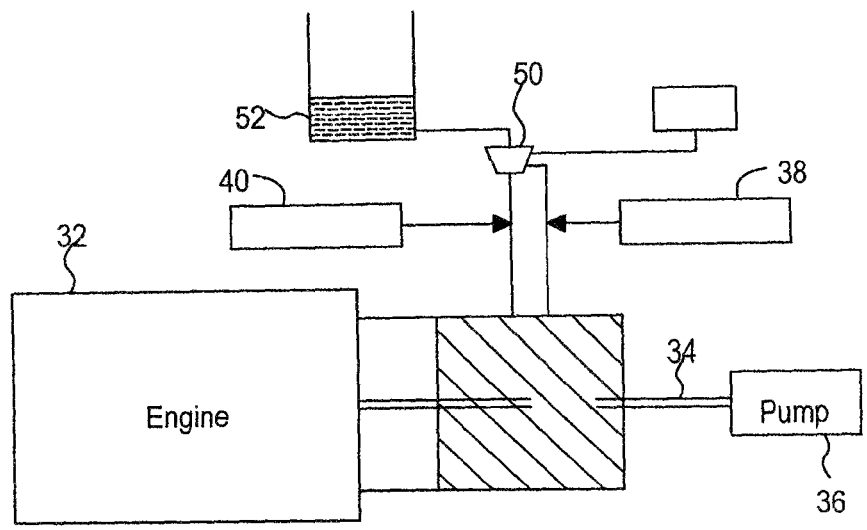
FIG. 3 illustrates one step in the use of an embodiment of the present invention.

As shown in FIG. 3, valve member 50 is positioned between the working fluid reservoir 52 and the two viscous clutches 38 and 40. The valve member 50 selectively directs the working fluid to one or both of the clutches. The operation of system 25 is shown schematically in FIGS. 4-6.

The fluid reservoir 52 is connected through valve 50 to the viscous clutches 38 and 40. The input member 60 of the two combined clutch mechanisms 38 and 40 is driven at input speed by the crankshaft 34 of the engine 32. The driven member of the viscous clutch 38 is indicated by reference numeral 62 while the driven member of viscous clutch 40 is indicated by reference numeral 64. The coolant pump 36 is driven by the driven member 62 of the viscous clutch 38. The heat generated by the system 25 is indicated by the "Q Out" arrows 70. The portion 66 of viscous clutch 40 is fixed and does not rotate. There is a very close tolerance between the outer diameter of the input member 60 and the housing member 68. This close tolerance is referred to by reference numeral 72.

Figure 4:
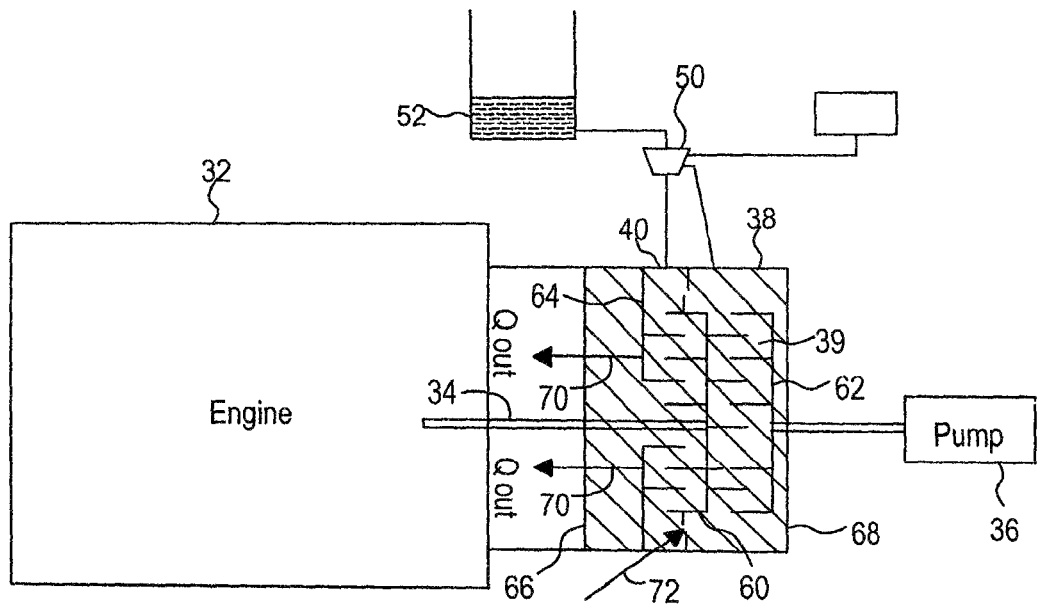
FIGS. 4-6 illustrate other steps in the performance of the invention in accordance with one of the embodiments.

As shown in FIG. 4, when the working chambers of both viscous clutches are full, the engine and pump turn at the same speed.

Figure 5:
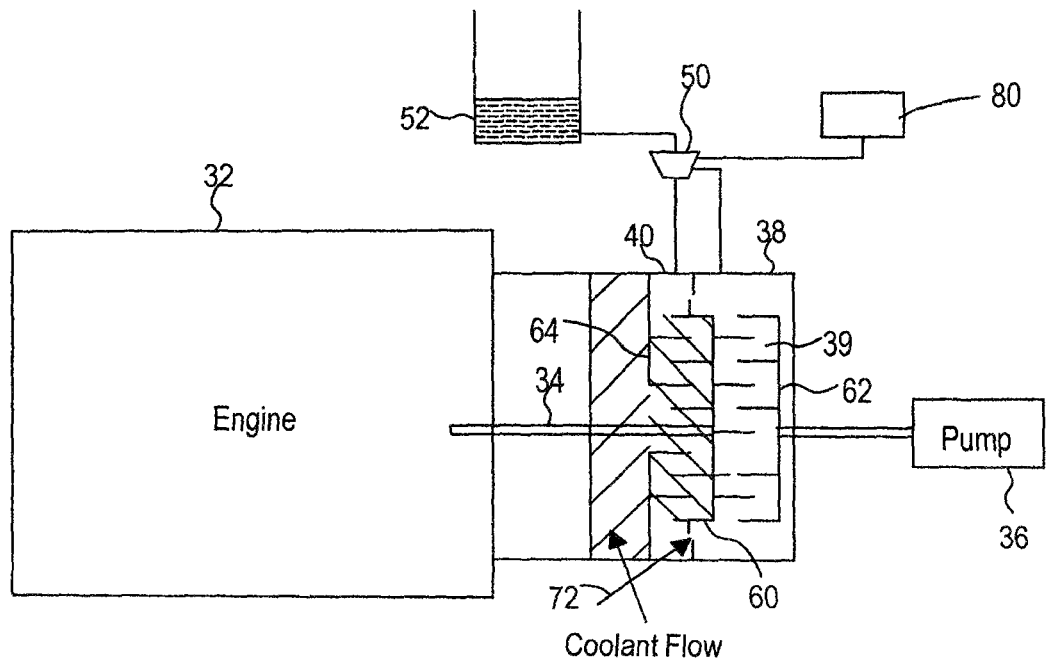

FIG. 5 schematically shows the situation where the heater mode is in the fully "on" condition. The valve 50 is operated by the engine control unit (ECU) or engine computer 80 to allow silicone fluid to only enter the space between the input member 60 and the rotating output member 64 of the viscous clutch member 40. At this point, the coolant pump is not operating and there is a full generation of heat provided from the viscous clutch 40.

Figure 6:
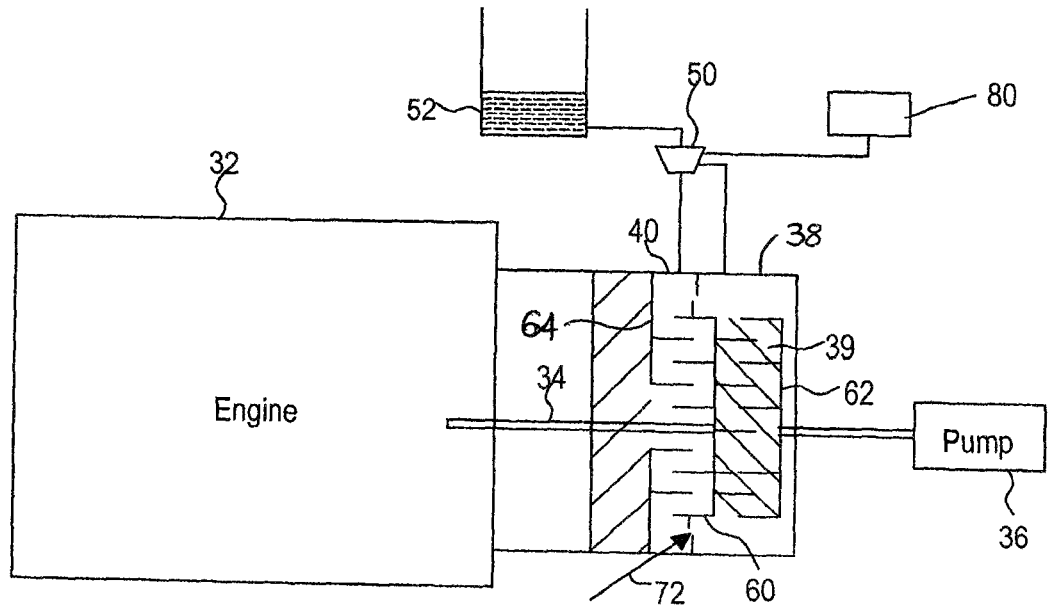

The situation when the heater is "off" is shown in FIG. 6. The valve member 50 has been operated by the electronic control unit 80 to provide fluid to the working chamber of viscous clutch 38. The working chamber is referred to by the reference numeral 39 and is positioned between the input member 60 and the output member 62. At this point, the pump member 36 will be in a fully "on" condition. Also, the working chamber of viscous clutch 40 is empty and the speed of the coolant pump 36 is being modulated and regulated solely by the viscous clutch 38. As a result, during the warm-up phase, independent control of the coolant pump speed in the viscous heater is achieved.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A supplemental heating system for vehicles, the vehicles having an engine and a crankshaft driven by the engine, said system comprising:
   a pump member for circulating a liquid coolant supplied to the engine;
   a viscous mechanism positioned in operable association with said crankshaft and pump member and positioned between the engine and said pump member;
   said viscous mechanism comprising:
      a pair of viscous clutch faces and a driven viscous plate positioned between said pair of viscous clutch faces;
      a reservoir of viscous fluid;
      a first working chamber for viscous fluid provided between said driven viscous plate and one of the viscous clutch faces, and a second working chamber for viscous fluid provided between said driven viscous plate and the other viscous clutch face; a viscous heater adjacent to and in contact with said first working chamber, said viscous heater selectively heating said liquid coolant flow present within said heater; and
      a valve member in operable association with said reservoir, said valve member selectively providing viscous fluid from said reservoir to one or both of said working chambers.

2. The supplement heating system as described in claim 1 wherein said engine is a diesel engine.

3. The supplement heating system as described in claim 1 wherein when supplemental heat is required, the first working chamber between said driven viscous plate and the viscous clutch face adjacent the engine is full, while the second working chamber between said driven viscous plate and the viscous clutch face adjacent said pump member is empty.

4. The supplement heating system as described in claim 1 wherein when no supplemental heat is required, the first working chamber between said driven viscous plate and the viscous clutch face adjacent the engine is empty and the second working chamber between said driven viscous plate and the viscous clutch face adjacent said pump member is substantially full of viscous fluid.

5. A viscous clutch mechanism for providing supplemental heat to a vehicle with an internal combustion engine, said mechanism comprising:
   a housing member;
   a driven viscous plate member in said housing member;
   a first viscous clutch face member positioned on one side of said viscous plate member forming a first working chamber;

a second viscous clutch face member positioned on the opposite side of said viscous plate member forming a second working chamber;

a viscous heater adjacent to and in contact with said first working chamber, said viscous heater selectively heating said liquid coolant flow present within said heater;

a reservoir of viscous fluid; and a valve member for selectively supplying viscous fluid to said first and second working chambers.

6. A viscous clutch mechanism as described in claim 5 wherein said engine is a diesel engine.

7. A viscous clutch mechanism as described in claim 5 further comprising an engine control unit for controlling the selective operation of said valve member.

8. A viscous clutch mechanism as described in claim 7 wherein said engine control unit controls the selective operation of said valve member based at least in part on signals indicating the desired supplemental heat and coolant flow.

9. A supplemental heating system for a vehicle, the vehicle having an engine, a crankshaft driven by the engine, a cooling pump, and an electronic control unit, said system comprising:

a first viscous clutch member positioned in operative association with said crankshaft and said cooling pump;

a second viscous clutch member positioned in operative association with said crank shaft;

a viscous heater adjacent to and in contact with said second working chamber, said viscous heater selectively heating said liquid coolant flow present within said heater;

a reservoir of viscous fluid; and a valve member for selectively supplying viscous fluid to either or both of said first and second viscous clutch members.

10. A supplemental heating system as described in claim 9 wherein said engine is a diesel engine.

11. A supplemental heating system as described in claim 9 wherein operation of said valve member is controlled by the electronic control unit.

12. A method of providing supplemental heat to a vehicle with an internal combustion engine and a crankshaft driven by the engine, said method comprising:

providing a viscous clutch mechanism comprising a housing member;

a driven viscous plate member in said housing member;

a first viscous clutch face member positioned on one side of said viscous plate member forming a first working chamber;

a second viscous clutch face member positioned on the opposite side of said viscous plate member forming a second working chamber;

a viscous heater adjacent to and in contact with said second working chamber, said viscous heater selectively heating said liquid coolant flow present within said heater;

a reservoir of viscous fluid;

a valve member for selectively supplying viscous fluid to said first and second working chambers;

said viscous clutch mechanism in operable association with the crankshaft; and filling said first chamber with a viscous fluid while maintaining said secondary working chamber substantially without viscous fluid.

13. A method of providing supplemental heat to a vehicle as described in claim 12 wherein fluid is provided to said first working chamber during initial start-up of the engine.

14. A method of providing supplemental heat to a vehicle as described in claim 12 wherein the engine is a diesel engine.

15. A method of providing supplemental heat to a vehicle as described in claim 12 further comprising an electronic control unit and further comprising the step of controlling said viscous clutch mechanism by said electronic control unit.

* * * * *